US012029995B2

(12) United States Patent
Halliburton

(10) Patent No.: US 12,029,995 B2
(45) Date of Patent: Jul. 9, 2024

(54) POUCH ASSEMBLY

(71) Applicant: SEATRIEVER INTERNATIONAL HOLDINGS LIMITED, Northwich (GB)

(72) Inventor: James Halliburton, Cheshire (GB)

(73) Assignee: SEATRIEVER INTERNATIONAL HOLDINGS LIMITED, Northwich (GB)

( * ) Notice: Subject to any disclaimer, the term of this patent is extended or adjusted under 35 U.S.C. 154(b) by 241 days.

(21) Appl. No.: 17/615,359

(22) PCT Filed: May 28, 2020

(86) PCT No.: PCT/GB2020/051286
§ 371 (c)(1),
(2) Date: Nov. 30, 2021

(87) PCT Pub. No.: WO2020/240182
PCT Pub. Date: Dec. 3, 2020

(65) Prior Publication Data
US 2022/0226746 A1 Jul. 21, 2022

(30) Foreign Application Priority Data
May 31, 2019 (GB) .................................... 1907746

(51) Int. Cl.
*A63H 27/10* (2006.01)
*B29D 22/02* (2006.01)
(Continued)

(52) U.S. Cl.
CPC ............. *A63H 27/10* (2013.01); *B29D 22/02* (2013.01); *A63B 41/00* (2013.01); *A63B 43/06* (2013.01);
(Continued)

(58) Field of Classification Search
CPC ............. A63H 27/10; A63H 2027/1025; A63H 2027/1041; A63H 2027/1058; A63H 2027/1083; A63H 2027/1091
(Continued)

(56) References Cited

U.S. PATENT DOCUMENTS

| 4,917,646 | A | * | 4/1990 | Kieves | .................... | A63H 27/10 |
| | | | | | | 156/289 |
| 5,108,339 | A | * | 4/1992 | Kieves | .................... | A63H 27/10 |
| | | | | | | 446/224 |

(Continued)

FOREIGN PATENT DOCUMENTS

| GB | 2472785 A | 2/2011 |
| GB | 2535830 A | 8/2016 |

(Continued)

OTHER PUBLICATIONS

Great Britain Search Report issued on Aug. 28, 2019, in connection with corresponding Great Britain Application No. GB1907746.0; 4 pages.

(Continued)

*Primary Examiner* — Alexander R Niconovich
(74) *Attorney, Agent, or Firm* — Maier & Maier, PLLC

(57) ABSTRACT

A balloon valve and pouch assembly is mounted in a neck portion of a balloon and comprises a balloon valve and a pouch. The pouch is adapted to receive and retain an illumination device in a predetermined position. The valve has a valve inlet and a valve outlet provided at an opposite end of the valve. The valve is delimited by a sealing path and two layers. The pouch comprises an opening through which an illumination device can be inserted and, opposite the pouch opening, a closed end of the pouch. The pouch is delimited by a first sealing path and two additional layers. The two additional layers are heat-sealed together along the first sealing path, which is substantially V-shaped, with the (Continued)

open end of the V-shape defining the pouch opening and the closed end of the V-shape defining the closed end of the pouch.

23 Claims, 5 Drawing Sheets

(51) Int. Cl.
 *A63B 41/00* (2006.01)
 *A63B 43/06* (2006.01)
(52) U.S. Cl.
 CPC ............ *A63H 2027/1025* (2013.01); *A63H 2027/1058* (2013.01); *A63H 2027/1083* (2013.01); *A63H 2027/1091* (2013.01)
(58) Field of Classification Search
 USPC .............. 446/220, 224, 485; 362/253, 267
 See application file for complete search history.

(56) References Cited

U.S. PATENT DOCUMENTS

| | | | | |
|---|---|---|---|---|
| 5,188,558 | A * | 2/1993 | Barton | A63H 27/10 446/224 |
| 5,295,892 | A * | 3/1994 | Felton | A63H 27/10 446/224 |
| 5,336,123 | A * | 8/1994 | Laske | A63H 27/10 383/44 |
| 5,669,702 | A * | 9/1997 | Wang | F21V 3/023 446/485 |
| 5,795,211 | A * | 8/1998 | Carignan | A63H 27/10 362/267 |
| 5,807,157 | A * | 9/1998 | Penjuke | G09F 21/10 446/224 |
| 5,860,441 | A * | 1/1999 | Garcia | F16K 15/147 446/224 |
| 5,947,581 | A * | 9/1999 | Schrimmer | F21V 3/023 362/363 |
| 6,155,901 | A * | 12/2000 | Chen | A63H 27/10 446/224 |
| 6,244,923 | B1 * | 6/2001 | Komaba | A63H 27/10 446/224 |
| 6,602,105 | B1 * | 8/2003 | Sussell | A63H 27/10 362/253 |
| 7,476,141 | B2 * | 1/2009 | Hom | A63H 33/22 446/485 |
| 7,478,779 | B2 * | 1/2009 | Nguyen | F21V 3/023 244/31 |
| 8,292,454 | B2 * | 10/2012 | Schrimmer | A63H 27/10 362/195 |
| 8,297,778 | B2 * | 10/2012 | Jeffrey | A63H 27/10 362/186 |
| 8,727,829 | B2 * | 5/2014 | Halliburton | A63H 27/10 446/224 |
| 8,950,888 | B2 * | 2/2015 | Halliburton | A63H 27/10 362/477 |
| 9,192,871 | B2 * | 11/2015 | Henrik | F21V 3/026 |
| 9,192,872 | B2 * | 11/2015 | Hakam | F21V 3/023 |
| 9,498,734 | B2 * | 11/2016 | Bo Stieler | A63H 27/10 |
| 2006/0291217 | A1 * | 12/2006 | Vanderschuit | A63H 33/22 362/363 |
| 2008/0242190 | A1 * | 10/2008 | Hofer | H03L 7/16 345/82 |
| 2009/0191787 | A1 * | 7/2009 | Rubinstein | A63H 27/10 446/220 |
| 2010/0018879 | A1 * | 1/2010 | Te | A47G 23/0641 206/139 |
| 2012/0129420 | A1 * | 5/2012 | Wu | A63H 27/10 446/220 |
| 2014/0235135 | A1 * | 8/2014 | Henrik | F21V 3/023 446/220 |

FOREIGN PATENT DOCUMENTS

| | | |
|---|---|---|
| JP | 05013496 U | 2/1993 |
| JP | 2013502257 A | 1/2013 |
| JP | 3201719 U | 12/2015 |
| TW | 201215814 A1 | 4/2012 |

OTHER PUBLICATIONS

International Search Report issued on Aug. 25, 2020, in corresponding International Application No. PCT/GB2020/051286; 4 pages.
International Written Opinion issued on Aug. 25, 2020, in corresponding International Application No. PCT/GB2020/051286; 5 pages.
International Preliminary Report on Patentability dated Nov. 16, 2021, in corresponding PCT application PCT/GB2020/051286, 6 pages.

* cited by examiner

POUCH ASSEMBLY

TECHNICAL FIELD

The present invention relates to a pouch assembly for use in an inflatable toy, an array of pouch assemblies, and an inflatable toy having the pouch assembly; and to methods relating thereto.

BACKGROUND

An inflatable toy can be formed of a flexible material that is inflatable with a gas, e.g. air or helium. Examples of inflatable toys include, e.g. balloons, balls and lilos.

It is known to provide an inflatable toy with an illumination device by mounting the illumination device inside of the inflatable toy. Examples of prior art inflatable toys having an illumination device can be found in GB2535830 and GB2472785.

In prior art inflatable toys having illumination devices, the illumination device is inserted and sealed in the inflatable toy (to render the illumination device inaccessible to an end user and facilitate accordance with toy safety regulations, e.g. European Standard EN 71) whilst the inflatable toy is being manufactured. A problem with this approach is that once the inflatable toy having the illumination device has been manufactured, it is not possible to access the illumination device from the exterior of the inflatable toy. Another problem with this approach is that bespoke/specialist manufacturing equipment is required to insert and seal the illumination device in the inflatable toy, which increases manufacturing costs. Another problem in the prior art is that different manufacturing equipment is required to manufacture inflatable toys having different illumination devices, which also increases manufacturing costs.

Another problem with prior art inflatable toys is that they lack compactness because the illumination device and the means of inflating or deflating the inflatable toy are typically provided in separate openings at separate locations on the inflatable toy. This configuration can also cause imbalance in the inflatable toy. In addition, the switch of the illumination device in prior art inflatable toys is typically provided outside of the inflatable toy, which further reduces compactness.

Another problem with prior art inflatable toys is that it can be difficult to securely retain an illumination device in the inflatable toy. This can result in the illumination device being incorrectly retained, such that the illumination device can become easily dislodged.

Another problem with prior art inflatable toys can be that the illumination device and the means of retaining the illumination device in the inflatable toy add to the total weight, which can be impractical and therefore less desirable. For example, where the inflatable toy is a balloon that is inflated with a low-density gas (e.g. helium), the additional weight of the illumination device and the means of retaining the illumination device can make it more difficult for the balloon to float. A known solution to this problem is to increase the total inflatable volume of the balloon, so that when the balloon is inflated with a low-density gas, the additional inflatable volume provides sufficient buoyancy for the balloon to float. However, increasing the inflatable volume of the balloon can mean that more gas is required to inflate the balloon, which increases costs.

It is an object of the present invention to at least partially overcome or alleviate one or more of the abovementioned or other problems.

SUMMARY

According to a first aspect of the present invention there is provided a pouch assembly for use in an inflatable toy, the pouch assembly comprising: a pouch comprising a pouch upper layer and a pouch lower layer, the pouch upper layer and the pouch lower layer being sealed together along a first sealing path, wherein the pouch is adapted to receive and retain an illumination device in a predetermined position.

By virtue of the pouch assembly, the pouch can be accessed after the inflatable toy having the pouch assembly is manufactured, such that an illumination device can be incorporated into the inflatable toy after the inflatable toy has been manufactured. For example, the inflatable toy having the pouch assembly can be first manufactured, and then the illumination device can be inserted into the pouch and sealed therein (i.e. two-step manufacture of the inflatable device having the illumination device). This means that the inflatable toy can be manufactured using standard manufacturing equipment rather than specialist/bespoke equipment (since the illumination device can be later inserted and sealed therein), which can reduce manufacturing costs. Moreover, the pouch can be sealed in order that an illumination device retained in the pouch is inaccessible to an end user, to facilitate accordance with toy safety regulations (e.g. European Standard EN 71).

In use, where an inflatable toy having the assembly is inflated and an illumination device is retained in the pouch, there is a pressure differential between the interior of the inflatable toy and the interior of the pouch, which results in any excess air being driven out of the pouch so that the pouch effectively forms a vacuous seal around the illumination device. This helps more securely retain the illumination device in the pouch.

Furthermore, by virtue of the pouch an illumination device can be easily and conveniently installed in the inflatable toy relative to inflatable toys of the prior art. The pouch also helps secure an illumination device in the inflatable toy, such that the illumination device is less prone to becoming dislodged.

Advantageously, the assembly provides a single unit for receiving and retaining an illumination device in an inflatable toy by way of the pouch, which can help reduce the total volume and weight of the inflatable toy. Thus, for example, in applications where the inflatable toy is a balloon having the assembly, the balloon being inflated by a low-density gas (e.g. a floating balloon), the balloon can be manufactured to a smaller inflatable volume (whilst having sufficient buoyancy to float when inflated and fitted with an illumination device) relative to balloons of the prior art (which must have a relatively large inflatable volume). Thus, a balloon having the assembly of the invention can be manufactured to a wide range of sizes relative to balloon of the prior art. Cost savings can therefore be attained by manufacturing smaller balloons which require less gas for inflation.

The inflatable toy may be any suitable inflatable toy as are known to a person skilled in the art. Examples of inflatable toys include but are not limited to balloons, balls and lilos. Examples of balloons include but are not limited to simple shaped balloons or complex shaped balloons. Examples of simple shaped balloons include but are not limited to geometric shapes, e.g. spheres, ellipsoids, ovoids or polyhedrons. Examples of complex shaped balloons include but are not limited to imitation objects, e.g. imitation swords.

The inflatable toy may be formed of a heat-sealable material. The inflatable toy may comprise one or more of polyethylene, polypropylene, polyester, nylon, polyvinyl chloride, cellulose acetate and cellophane. The inflatable toy may consist essentially of polyethylene. The inflatable toy may comprise low-density polyethylene. The inflatable toy may consist essentially of low-density polyethylene. Advantageously, low-density polyethylene can be easily heat sealed, and is readily available and inexpensive. The inflatable toy may comprise one or more sheets. The inflatable toy may be formed of plastics material. The inflatable toy may be metallised.

The illumination device may be any suitable illumination device as are known to a person skilled in the art. The illumination device may comprise an illumination element operable to emit light. The illumination element may be a lamp or a light emitting diode (LED). The illumination device may comprise a printed circuit board (PCB). The PCB may be flexible.

The illumination device may comprise a battery arranged in electronic communication with the illumination element by an electronic circuit.

The illumination device may comprise a switch operable to switch the illumination device on or off. The switch may be a button switch. The switch may form part of the electronic circuit.

The illumination device may comprise a pull tab arranged to prevent electrical connection between the battery and the illumination element. Use of a pull tab is advantageous for preventing drainage of battery power. The pull tab may be arranged between electrical contacts in the circuit so as to prevent flow of electrical charge. The pull tab may be removable from the electrical contacts so as to permit electrical connection between the battery and the illumination element. In use, the pull tab may be accessed from the outside of the inflatable toy.

The illumination device may be an LED strip light (also known as an LED tape or ribbon light).

The illumination device may comprise a communications unit. Examples of communications units include but are not limited to Bluetooth devices, GPS devices and Wi-Fi devices.

The illumination device may comprise a processor operable to process information. For example, the information may be control signals received by the communications unit.

The illumination device may comprise output means. Examples of output means include but are not limited to audio output means and video output means.

The illumination device may comprise haptic feedback means. Examples of haptic feedback means include but are not limited to vibration means.

The pouch may be adapted to receive and retain an illumination device therein. This can obscure the physical components of the illumination device from view, and thereby improves compactness and tamper resistance.

Where the illumination device is an illumination device, the pouch may be adapted to receive and retain a switch of an illumination device therein. The pouch may be adapted to receive and retain an illumination element of an illumination device therein. By retaining the switch and/or the illumination element in the pouch, the illumination device is better retained in position, more tamper resistant and less prone to becoming dislodged.

The pouch may be delimited by the first sealing path, the pouch upper layer and the pouch lower layer.

The pouch may comprise gripping means adapted to retain an illumination device in a predetermined position. The gripping means may be adapted to retain a switch of an illumination device in a predetermined position. The gripping means may be provided as one or more projections. The projections may be curved or straight. The gripping means may be provided as one or more projections formed by the first sealing path. Advantageously, the gripping means can help securely retain an illumination device in the pouch.

The pouch may comprise an opening through which an illumination device can be inserted. The opening may be provided at one end of the pouch and an opposite end of the pouch may be closed.

In use, the pouch assembly may be arranged so that the pouch can form a vacuous seal around an illumination device retained therein. In use, the pouch may project into the interior of an inflatable toy.

The assembly may comprise an inflation valve. Thus, the assembly may be an inflation valve and pouch assembly for use in an inflatable toy. In use, the inflation valve can facilitate inflation and deflation of an inflatable toy having the assembly. Moreover, as the valve and pouch are provided as a single unit in this arrangement, an inflatable toy having the assembly can be more lightweight, compact and better balanced relative to inflatable toys of the prior art in which the means of retaining an illumination device in the inflatable toy and the inflation valve are provided in separate openings at separate locations.

In applications where the inflatable toy is a balloon, the inflation valve may be a balloon valve.

The valve may comprise a valve inlet and a valve outlet. The valve inlet may be provided at one end of the valve and the valve outlet may be provided at an opposite end of the valve. As a person skilled in the art will appreciate, in use, to inflate an inflatable toy comprising the assembly, air may be directed through the valve inlet and out of the valve outlet, into the inflatable toy; and to deflate the inflatable toy, air may be directed through the valve outlet and out of the valve inlet, out of the inflatable toy.

The valve may be self-sealing. Thus, in use, when an inflatable toy comprising the assembly is inflated, the internal pressure of the inflatable toy can seal the valve.

The valve may comprise a valve upper layer and a valve lower layer. The valve upper layer and the valve lower layer may be sealed together along a second sealing path. The valve may be delimited by the second sealing path, the valve upper layer and the valve lower layer.

The pouch may be arranged adjacent to or on the valve.

The valve inlet may be arranged proximal to the pouch opening. The valve outlet may be arranged proximal to the closed end of the pouch. In this way, the valve inlet and pouch inlet are conveniently positioned (i.e. close to one another) and easily accessible.

The first sealing path and/or the second sealing path may be formed by any suitable sealing process. The first sealing path and/or the second sealing path may be formed by heat-sealing. Suitable heat-sealing methods are known to a person skilled in the art.

The assembly may be provided with one or more heat-resistant patches. Advantageously, the heat-resistant patches are operable to prevent the occurrence of heat sealing (e.g. during a heat-sealing process) in desired locations on the assembly. In this way, where heat sealing is used on the assembly, the heat sealing can be accurately localised such that the specific shape and dimensions of the valve and/or pouch can be controlled.

The valve and/or the pouch may be provided with one or more heat-resistant patches. The valve upper layer and/or the valve lower layer may be provided with one or more heat-resistant patches. The pouch upper layer and/or the pouch lower layer may be provided with one or more heat-resistant patches. Each of the valve upper layer, the valve lower layer, the pouch upper layer and the pouch lower layer may be provided with one or more heat-resistant patches. Each heat resistant patch may be provided in any suitable shape for a particular application.

Each heat-resistant patch may comprise heat-resistant ink.

The assembly may be formed of any suitable material as will be known to a person skilled in the art. The assembly may be formed of a heat-sealable material.

The assembly may comprise one or more of polyethylene, polypropylene, polyester, nylon, polyvinyl chloride, cellulose acetate and cellophane. The assembly may consist essentially of polyethylene. The assembly may comprise low-density polyethylene. The assembly may consist essentially of low-density polyethylene. Advantageously, low-density polyethylene can be easily heat sealed, and is readily available and inexpensive.

The assembly may be formed from a single film.

The total thickness of the assembly may be from 100 to 160 microns. Total thicknesses below 100 microns can result in lower product performance, and total thicknesses above 160 microns can result in manufacturing difficulties.

The thickness of each of the valve upper layer and/or the valve lower layer and/or the pouch upper layer and/or the pouch lower layer may be from 25 to 40 microns. Thicknesses below 25 microns can result in lower product performance, and thicknesses above 40 microns can result in manufacturing difficulties.

According to another aspect of the present invention there is provided an array of pouch assemblies for use in an inflatable toy, the array comprising a plurality of pouch assemblies according to the first aspect of the present invention, wherein the pouch assemblies are connected together.

By provision of a plurality of assemblies connected together, the array can be used to quickly and conveniently prepare a plurality of inflatable toys each having a assembly. This results in more efficient inflatable toy manufacture.

The assemblies may be connected together side-by-side.

Each assembly may be separated from another assembly by an assembly cut line. In this way, respective assemblies can be separated (i.e. individualised) by cutting along the assembly cut line.

According to another aspect of the present invention, there is provided an inflatable toy comprising a pouch assembly according to the first aspect of the present invention, wherein the assembly is mounted in a neck of the inflatable toy.

The assembly may be mounted in the neck of the inflatable toy using any suitable means. The assembly may be mounted in the neck of the inflatable toy by sealing means (e.g. heat-sealing).

The inflatable toy may comprise an illumination device. The illumination device may be received and retained in the pouch in a predetermined position.

In use, where the inflatable toy comprises the assembly and an illumination device is retained in the pouch, the illumination device comprising a pull tab, the assembly allows external control of the lighting of the inflatable toy via the pull tab. In this way, the lighting of the inflatable toy can be controlled externally of the inflatable toy without damaging the sealing of the inflatable toy.

According to another aspect of the present invention there is provided a method of manufacturing a pouch assembly for use in an inflatable toy, the assembly comprising a pouch, wherein the pouch is adapted to receive and retain an illumination device in a predetermined position, the method comprising the steps of:

(a) providing a pouch upper layer and pouch lower layer; and (b) sealing together the pouch upper layer and the pouch lower layer to form a pouch.

By sealing the respective layers together to form the pouch, the assembly can be efficiently manufactured in terms of physical requirements and/or cost.

Step (a) may further comprise providing a valve upper layer and valve lower layer. Step (b) may further comprise sealing together the valve upper layer and the valve lower layer to form an inflatable toy valve. Thus, the method may be a method of manufacturing an inflatable toy valve and pouch assembly for use in an inflatable toy.

In step (a), at least one of the pouch upper layer, the pouch lower layer, where present the valve upper layer and where present the valve lower layer may be provided with one or more heat-resistant patches. Advantageously, the heat-resistant patches are operable to prevent heat sealing (e.g. during a heat-sealing process) at desired locations on the assembly. In this way, when heat sealing is used on the assembly, the heat sealing can be accurately localised such that the specific shape and dimensions of the valve and/or pouch can be controlled. In step (a), each of the pouch upper layer, the pouch lower layer, where present the valve upper layer and where present the valve lower layer may be provided with one or more heat-resistant patches. Each heat-resistant patch may comprise heat-resistant ink.

In step (a), the pouch upper layer, the pouch lower layer, where present the valve upper layer and where present the valve lower layer may be provided on a single film. In this way, the assembly can be more efficiently manufactured relative to known methods wherein multiple separate films are used.

In step (a), the pouch upper layer may be connected to the pouch lower layer by a pouch fold line. In step (a), the pouch lower layer may be connected to the valve upper layer by an intermediate cut line. In step (a), the valve upper layer may be connected to the valve lower layer by a valve fold line.

Herein, a 'fold line' constitutes a region along which respective layers can be folded. Herein, a 'cut line' constitutes a region along which respective layers can be folded and separated by cutting.

In step (b), the sealing may be achieved using any suitable sealing means. Suitably, in step (b), the sealing is heat-sealing. Suitable heat-sealing methods are well known to a person skilled in the art.

In step (b), the pouch upper layer and the pouch lower layer may be sealed together along a first sealing path to define the pouch.

In step (b), the valve upper layer and the valve lower layer may be sealed together along a second sealing path to define the valve.

The method may comprise, after step (a) and before step (b), cutting the intermediate cut line to separate the pouch lower layer from the valve upper layer. The method may comprise, after step (a) and before step (b), folding along the valve fold line so that the valve upper layer is arranged on the valve lower layer. The method may comprise, after step (a) and before step (b), folding along the pouch fold line so that the pouch upper layer is arranged on the pouch lower layer.

The method may comprise, after forming the valve and the pouch (i.e. in step (c)), cutting off an end of the valve towards the fold line, such that the valve is open at both ends.

The method may comprise, after forming the valve and the pouch (i.e. in step (c)), sealing the valve to the pouch. In this way the valve and pouch form an integrated unit. This prevents the valve and pouch from separating. The sealing may be heat-sealing.

The method may comprise, after step (b) or step (c) (i.e. in step (d)), inserting an illumination device into the pouch.

The method may comprise, after step (b) or step (c) or step (d) (i.e. in step (e)), arranging the assembly in inflatable toy material; optionally cutting the inflatable toy material to shape; and sealing the assembly in the inflatable toy material. In this way, the method may be a method of manufacturing an inflatable toy.

The method may comprise, after step (b) or step (c) or step (d) or step (e), sealing the inflatable toy material around the illumination device such that the illumination device is securely retained in the inflatable toy. This renders the illumination device inaccessible and can facilitate accordance with European Standard EN 71.

The inflatable toy material may be provided with marking lines. The marking lines facilitate alignment of the inflatable toy material.

The method may comprise, after step (b) or step (c), holding the assembly and the inflatable toy material together using holding means. This can help align the assembly and the inflatable toy material before and during sealing. The holding means may be applied electrostatic attraction. The electrostatic attraction may be applied on the assembly and/or the inflatable toy material.

The method may be used to manufacture an array of assemblies. In such implementations, step (a) comprises providing respective pouch upper layers, pouch lower layers, where present valve upper layers and where present valve lower layers; and step (b) comprises sealing together the pouch upper layers and the pouch lower layers to form respective pouches, and where present the valve upper layers and where present the valve lower layers to form respective valves.

In such implementations, the assemblies may be connected together, side-by-side.

In such implementations, the assemblies may be provided on a single film.

In such implementations, the respective assemblies may be separated by assembly cut lines. The assembly cut lines can be cut to individualise (i.e. separate) the assemblies.

Any optional feature of one aspect of the present invention is equally applicable in relation to any other aspect of the present invention.

BRIEF DESCRIPTION OF THE FIGURES

In order that the invention may be more clearly understood, an embodiment thereof will now be described, by way of example only, with reference to the accompanying drawings, of which.

DETAILED DESCRIPTION

With reference to FIGS. 1 to 5, a balloon valve and pouch assembly 1 is mounted in a neck portion of a balloon and comprises a balloon valve 2 and a pouch 3. The pouch 3 is adapted to receive and retain an illumination device 100 in a predetermined position.

Figure 1:
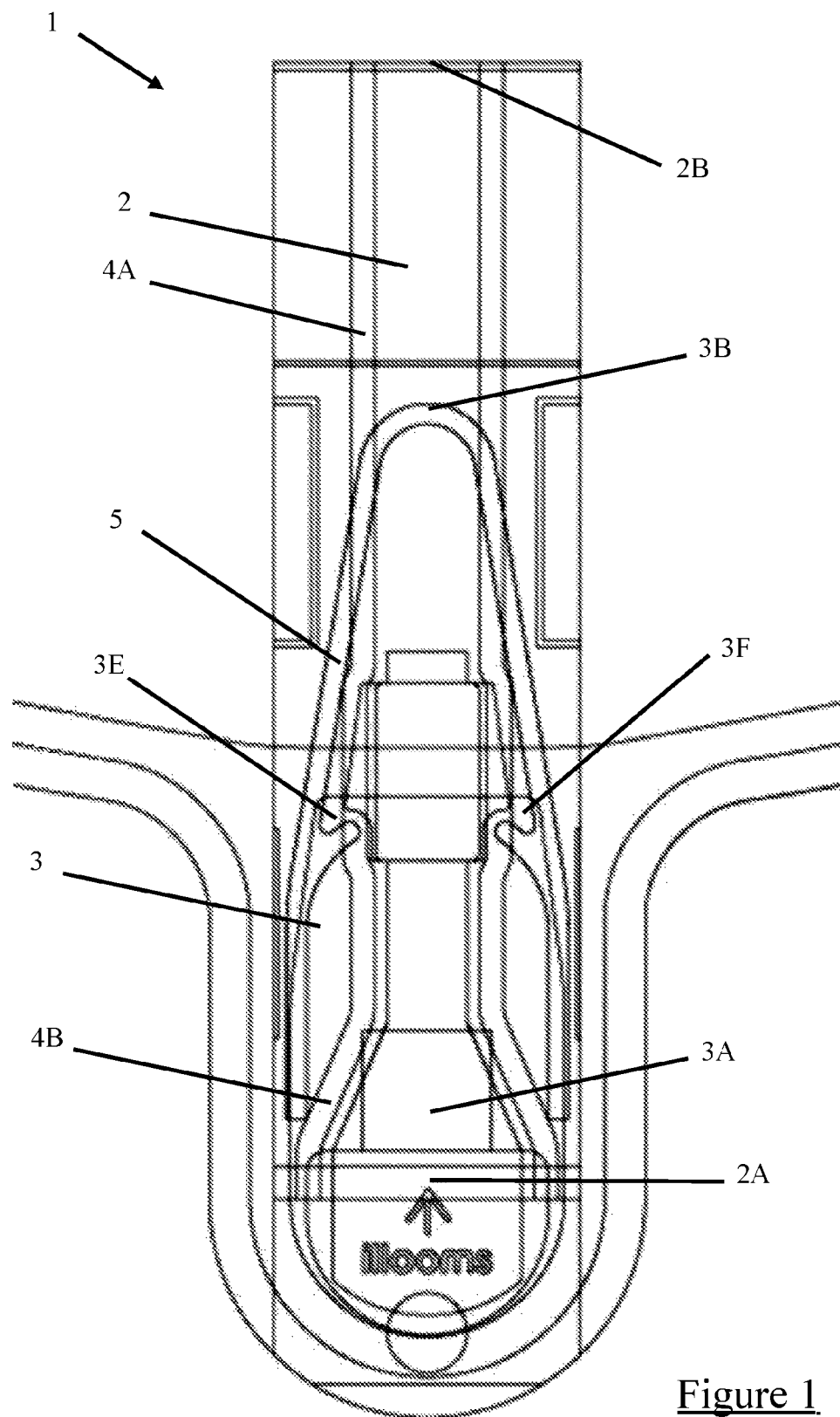
FIG. 1 shows a sectional view of a balloon having a balloon valve and pouch assembly mounted in a neck portion of the balloon, in accordance with the present invention.
Figure 2:
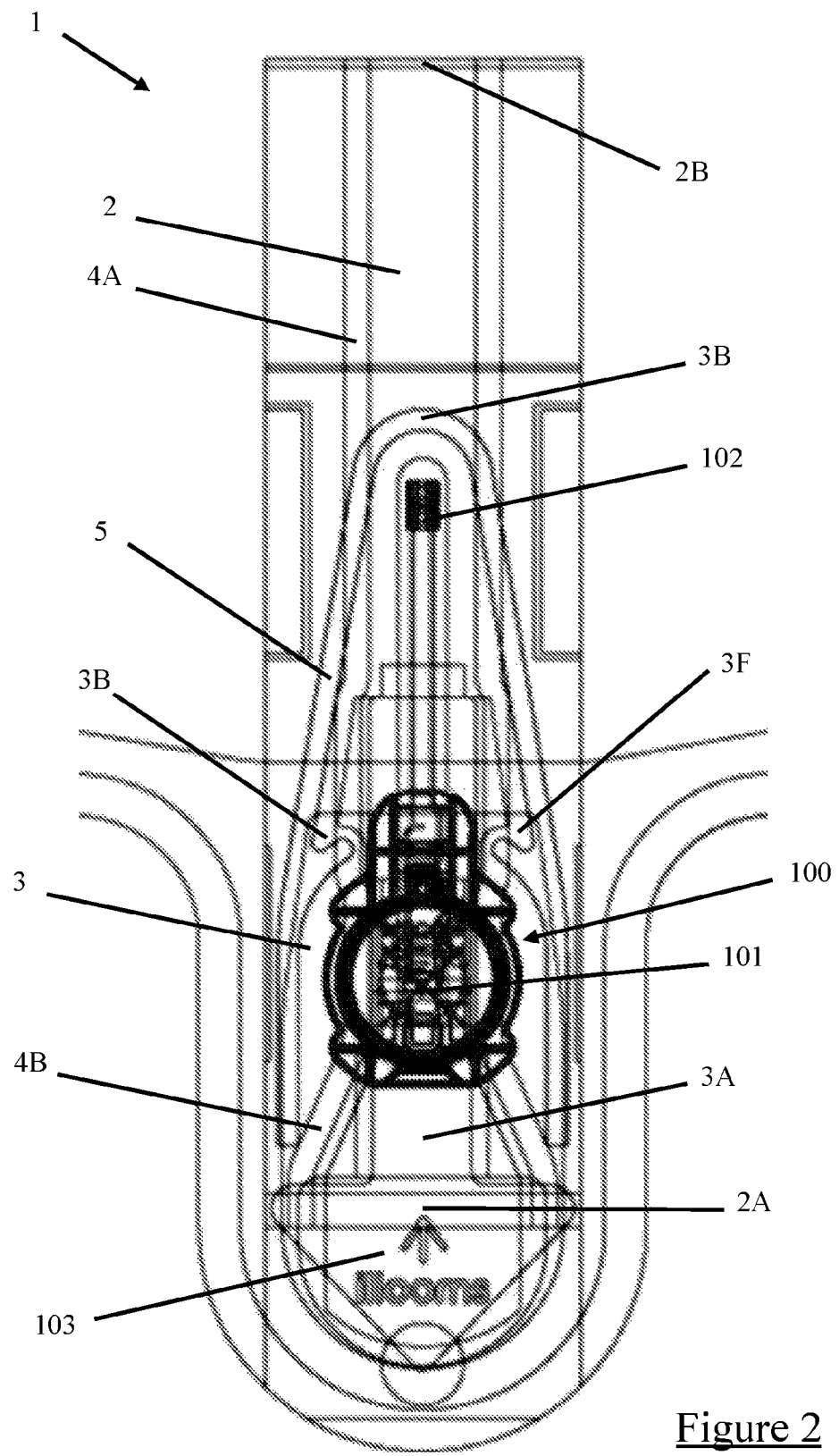
FIG. 2 shows the balloon of FIG. 1 wherein an illumination device is retained in the assembly.
Figure 5:
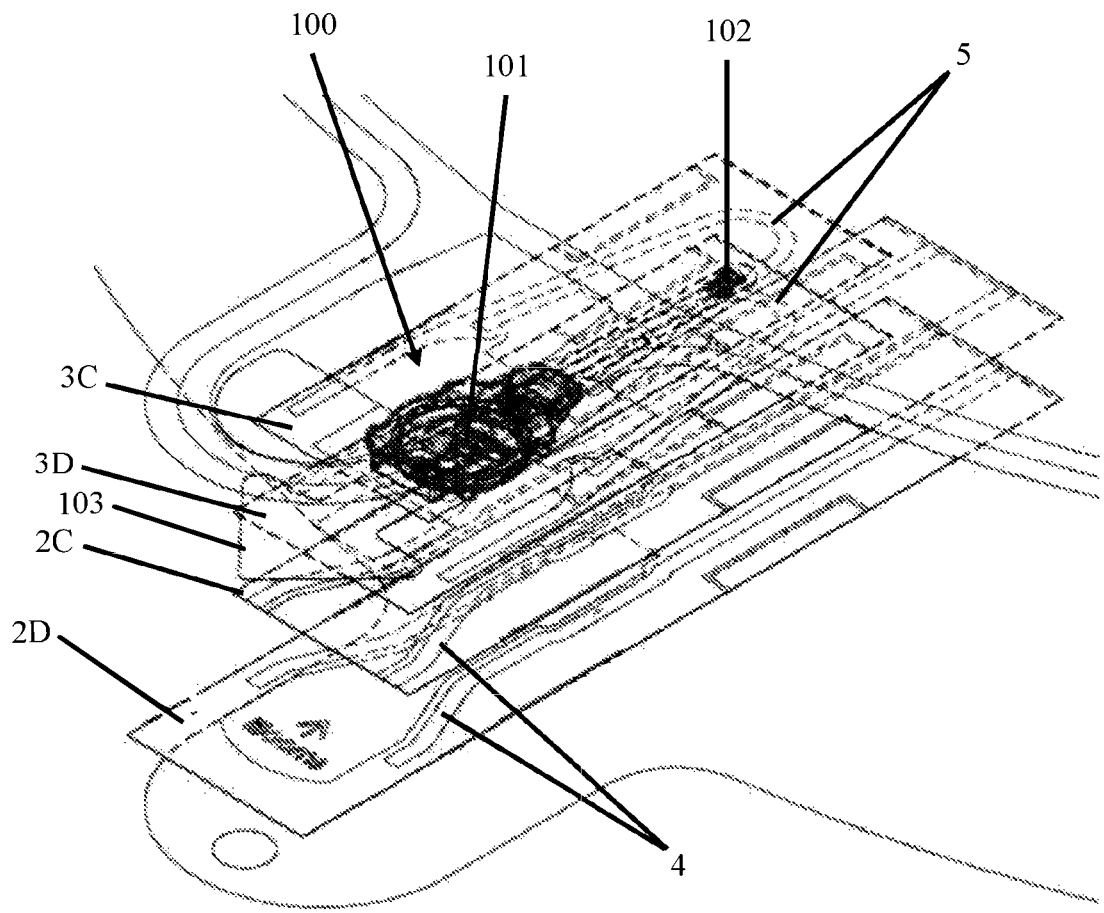
FIG. 5 shows an exploded perspective view of the balloon of FIG. 1 wherein an illumination device is retained in the assembly.

As shown in FIGS. 2 and 5, the illumination device 100 comprises a battery (not shown), an electrical circuit (now shown), a button switch 101 operable to switch the device on or off, a light emitting diode (LED) as an illumination element 102 operable to emit light when the device is switched on, and a removable pull tab 103 configured to prevent electrical connection between the battery and the illumination element 102. As a person skilled in the art will appreciate, the pull tab 103 is arranged between electrical contacts in the electrical circuit and prevents flow of electrical charge and thus illumination of the illumination element 102; and can be removed from the electrical contacts to permit flow of electrical charge and thus illumination of the illumination element 102. The pull tab prevents inadvertent drainage of battery power.

The valve 2 has a valve inlet 2A and a valve outlet 2B. The valve inlet 2A is provided at one end of the valve 2 and the valve outlet 2B is provided at an opposite end of the valve 2. The valve 2 comprises a valve upper layer 2C and a valve lower layer 2D. The layers 2C, 2D are heat-sealed together along a second sealing path 4, which includes a substantially rectangular portion 4A adjoining a substantially funnel-shaped portion 4B. The funnel-shaped portion 4B is arranged towards the valve inlet 2A and the rectangular portion 4A terminates towards the valve outlet 2B. The valve 2 is self-sealing. The valve 2 is delimited by the second sealing path 4 and the layers 2C, 2D.

The pouch 3 comprises an opening 3A through which an illumination device 100 can be inserted (see FIGS. 2 and 5). The opening 3A is provided at one end of the pouch 3 and an opposite end of the pouch 3B is closed. The pouch 3 comprises a pouch upper layer 3C and a pouch lower layer 3D. The layers 3C, 3D are heat-sealed together along a first sealing path 5, which is substantially V-shaped, with the open end of the V-shape defining the pouch opening 3A and the closed end of the V-shape defining the closed end of the pouch 3B. The pouch 3 is delimited by the first sealing path 5 and the layers 3C, 3D.

The pouch 3 is arranged on and heat sealed to the valve 2 so that the valve inlet 2A is arranged towards the pouch opening 3A and the valve outlet 2B is arranged towards the closed end 3B of the pouch. The pouch 3 comprises two gripping projections 3E, 3F which are adapted to retain the illumination device 100 in a predetermined position. The projections 3E, 3F are formed by the first sealing path 5; face radially inwards, towards each other; and project towards the closed end of the V-shape at an oblique angle with respect to the longitudinal axis of the V-shape. The projections 3E, 3F contact and support the button switch 101 and thereby help securely retain the illumination device 100 in a predetermined position in the pouch 3. The LED illumination element 102 extends between the projections 3E, 3F, towards the closed end of the pouch, and is retained by and within the first sealing path 5 (see FIGS. 2 and 5).

The balloon valve and pouch assembly 1 is provided with heat-resistant patches 6A, 6B. The heat-resistant patches 6A, 6B comprise heat-resistant ink, which prevents the occurrence of heat-sealing (e.g. see FIG. 3). The patches 6A are provided on the valve layers 2C, 2D and are substantially torch shaped. Specifically, on each layer 2C, 2D, a patch 6A starts at the funnel-shaped portion of the second sealing path 4 and terminates approximately half-way down the second sealing path 4. On each layer 3C, 3D, a patch 6B is provided towards the pouch opening 3A and another patch 6B is provided between the gripping projections 3E, 3F and towards the closed end 3B of the pouch.

The layers 2C, 2D, 3C, 3D of the assembly 1 are manufactured from a single low-density polyethylene film 10 having a thickness of about 25 microns.

A method of manufacturing an array of balloon valve and pouch assemblies is described below.

Figure 3:
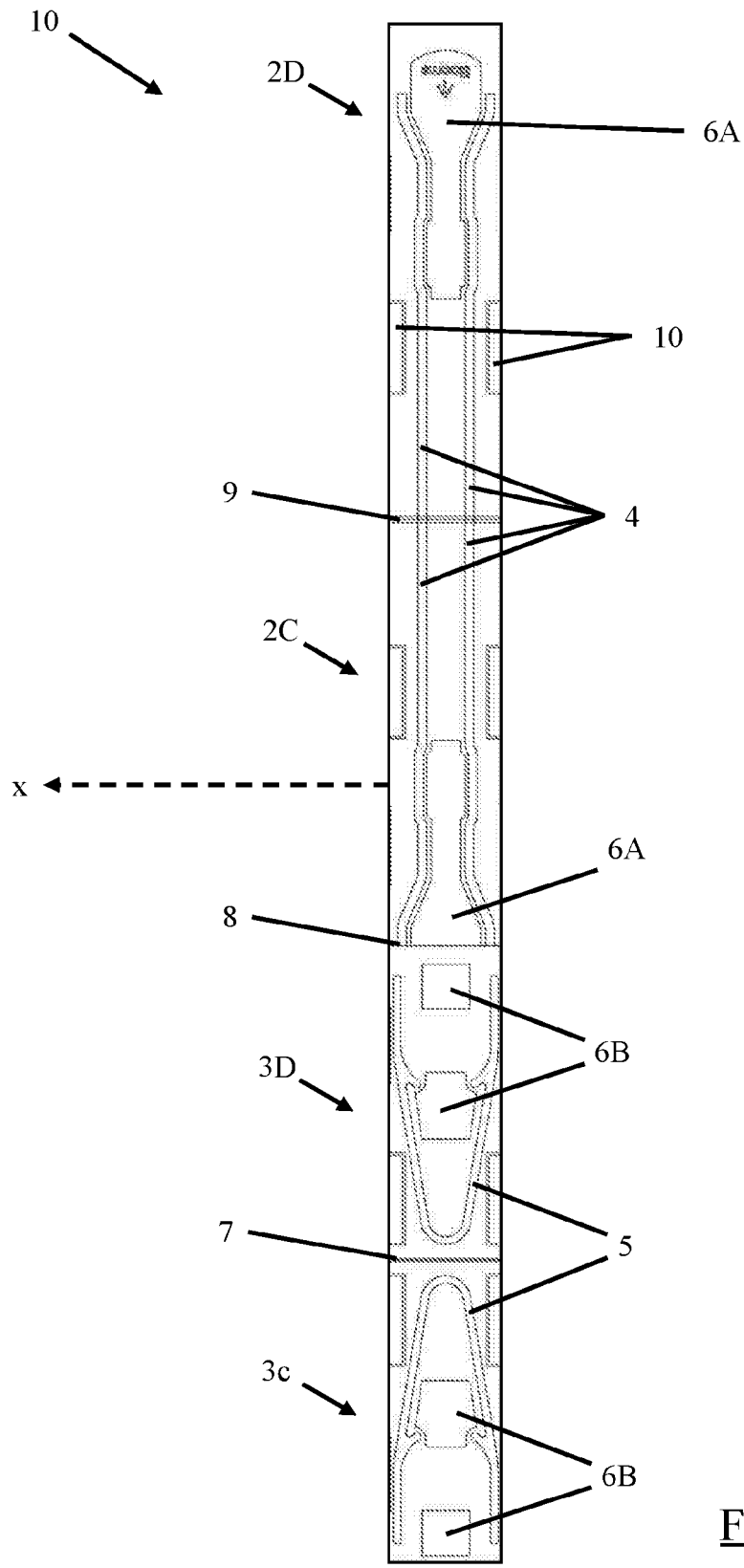
FIG. 3 shows a portion of a film used to manufacture the assembly of the balloon of FIG. 1.
Figure 4:
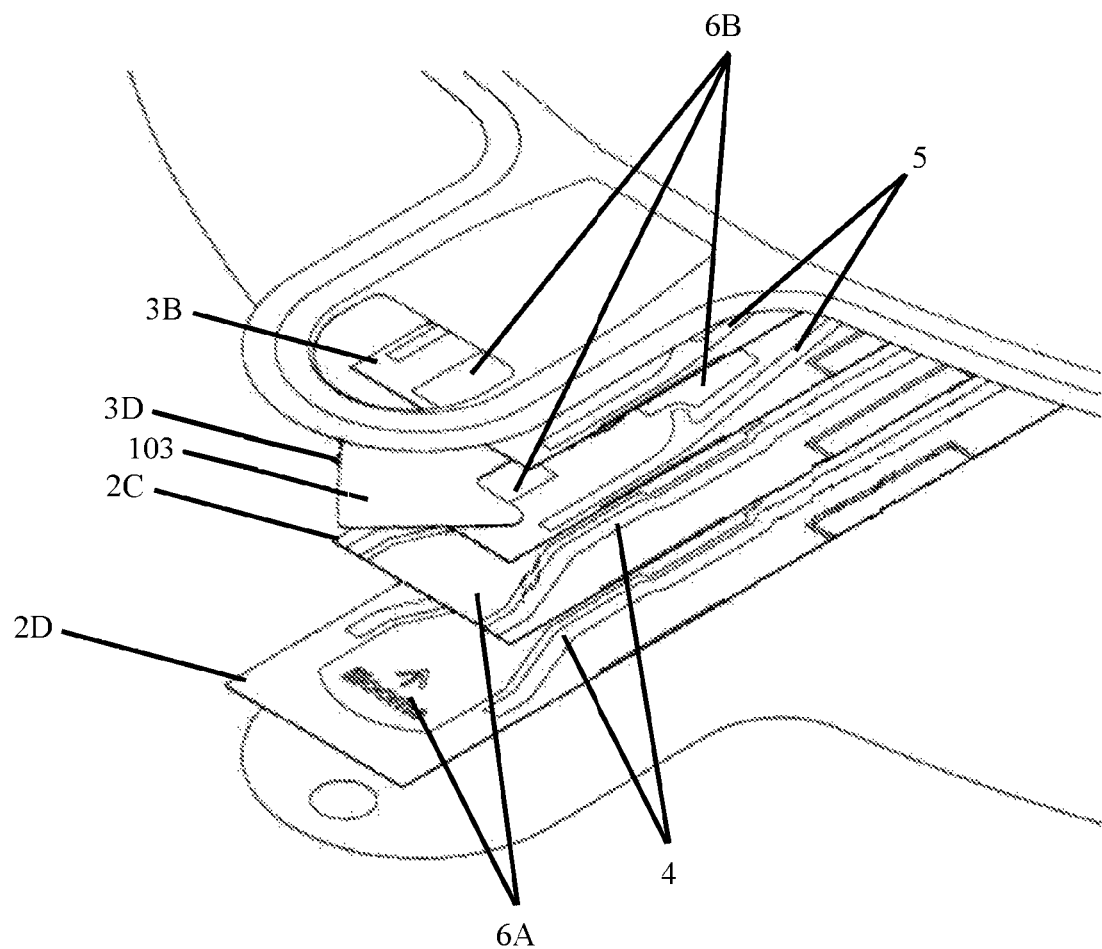
FIG. 4 shows an exploded perspective view of the balloon of FIG. 1.

The film 10 is provided with printed markings corresponding to respective valve upper layers 2C, valve lower layers 2D, pouch upper layers 3C, pouch lower layers 3D, fold lines 7 connecting each pouch upper layer 3C to its corresponding pouch lower layer 3D, intermediate cut lines 8 connecting each pouch lower layer 3D to its corresponding valve upper layer 2C, valve fold lines 9 connecting each valve upper layer 3C to its corresponding valve lower layer 3D, and optionally markers which provide a visual indication of whether or not the layers 2C, 2D, 3C, 3D are correctly aligned when folded together in position (as detailed below). In this way, a plurality of printed markings corresponding to respective balloon valve and pouch assemblies are provided side-by-side on the film. The longitudinal axes of the printed markings corresponding to the respective balloon valve and pouch assemblies are arranged in parallel to each other. A portion of the film is illustrated in FIG. 3. For simplicity, only markings for a single assembly 1 is shown in FIG. 3. In other words, the film 10 includes a plurality of further balloon valve and pouch assemblies 1, connected together side-by-side, extending along axis 'X' as shown in FIG. 3.

The film 10 is also provided with heat resistant patches 6A, 6B, which comprise heat-resistant ink. The heat resistant patches 6A, 6B prevent the occurrence of heat-sealing in the areas of the film on which the patches 6A, 6B are provided.

The film 10 is cut along each intermediate cut line 8 so that the valve upper layers 2C are separated from the pouch lower layers 3D.

The film 10 is folded along the valve fold lines 9 so that the valve upper layers 2C are arranged on the valve lower layers 2D, such that the heat-resistant patches 6A provided on the valve upper layers 2C overlap with the heat-resistant patches 6A provided on the valve lower layers 2D.

The film 10 is folded along the pouch fold lines 7 so that the pouch upper layers 3C are arranged on the pouch lower layers 3D, such that the heat resistant patches 6B provided on the pouch upper layers 3C overlap with the heat-resistant patches 6B provided on the pouch lower layers 3D.

The valve upper layers 2C are heat sealed to the valve lower layers 2D along second sealing paths 4 to thereby define respective valves 2. Each valve 2 is thus delimited by the layers 2C, 2D and its respective second sealing path 4. Each valve 2 has a valve inlet 2A and a valve outlet 2B.

The pouch upper layers 3C are heat sealed to the pouch lower layers 3D along first sealing paths 5 to thereby define respective pouches 3. Each pouch 3 is thus delimited by the layers 3C, 3D and its respective first sealing path 5. Each pouch 3 has at one end thereof a pouch opening 3A through which an illumination device 100 can be inserted, and at an opposite end thereof 3B is closed.

With respective valves 2 and pouches 3 now formed, the pouches 3 are arranged on the valves 2 so that the pouch lower layers 3D are arranged on the valve upper layers 2C. In this way, the pouch openings 3A are proximal to the valve inlets 2A and the closed ends 3B of the pouches are proximal to the valve outlets 2B. The abovementioned optional markers can be used to align the valves 2 and the pouches 3.

The respective valves 2 and pouches 3 are heat sealed together at various tacking locations.

A person skilled in the art will appreciate that heat sealing at the tacking locations must not interfere with the valves 2 and the pouches 3.

An end of the valves 2 towards the fold lines 7 is cut off, so that the valve 2 is open at both ends, the cut-off end defining the valve outlet 2B and the opposite end defining a valve inlet 2A.

An array of balloon valve and pouch assemblies 1 is thus manufactured, wherein the respective balloon valve and pouch assemblies 1 are connected together side-by-side. As a person skilled in the art will appreciate, the respective balloon valve and pouch assemblies 1 can be individualised using any suitable cutting means.

A person skilled in the art will appreciate that the order of occurrence of the folding, cutting and sealing steps may be varied as required.

A method of manufacturing a foil balloon comprising an assembly 1 according to the present invention is described below.

An illumination device 100 having a button switch 101 and an LED illumination element 102 is inserted through the pouch opening, so that the button switch 101 is retained in the pouch by the gripping projections 3E, 3F and the LED illumination element 102 projects between the gripping projections 3E, 3F towards the closed end 3B of the pouch and is retained by and within the first sealing path 5.

With the illumination device 100 received in the assembly 1, the assembly 1 is arranged between two foil sheets of balloon material, which are substantially identical in shape and dimensions. The foil sheets are heat-sealed together along their periphery and subsequently cut to shape to form a balloon including a neck portion in which the assembly 1 is mounted. The components of the illumination device 100 are obscured from view.

Optionally, an electrostatic attractive force may be applied to the assembly 1 and/or the foil sheets of balloon material prior to sealing together the assembly 1 and the foil sheets. This holds in position the assembly 1 and the foil sheets and prevents inadvertent separation thereof.

The above embodiment is described above by way of example only. Many variations are possible without departing from the scope of protection as defined by the appended claims. In particular, whilst a balloon is described in the above embodiment, a person skilled in the art will appreciate that the present invention extends to other inflatable toys.

The invention claimed is:

1. A pouch assembly for use in an inflatable toy, the pouch assembly comprising:
a pouch comprising a pouch upper layer and a pouch lower layer, the pouch upper layer and the pouch lower layer being sealed together along a first sealing path, wherein the pouch is adapted to receive and retain an illumination device in a predetermined position, comprises gripping means provided as one or more projections, and configured to retain the illumination device in a predetermined position.

2. An assembly according to claim 1 wherein the pouch is delimited by the first sealing path, the pouch upper layer and the pouch lower layer.

3. An assembly according to claim 1 wherein the pouch comprises an opening through which an illumination device can be inserted.

4. An assembly according to claim 3 wherein the opening is provided at one end of the pouch and an opposite end of the pouch is closed.

5. An assembly according to claim 1, wherein the one or more projections are formed by the first sealing path.

6. An assembly according to claim 1 wherein the assembly is provided with one or more heat resistant patches.

7. An assembly according to claim 1 wherein the assembly is formed of a heat-sealable material.

8. An assembly according to claim 1 wherein the assembly comprises a valve.

9. An assembly according to claim 8 wherein the valve comprises a valve upper layer and a valve lower layer, the valve upper layer and the valve lower layer being sealed together along a second sealing path so that the valve is delimited by the second sealing path, the valve upper layer and the valve lower layer.

10. An array of pouch assemblies, the array comprising a plurality of pouch assemblies according to claim 1 wherein the pouch assemblies are connected together.

11. An inflatable toy comprising a pouch assembly according to claim 1, wherein the pouch assembly is mounted in a neck of the inflatable toy.

12. An inflatable toy according to claim 11 wherein the inflatable toy comprises an illumination device.

13. A method of manufacturing a pouch assembly comprising a pouch, wherein the pouch is adapted to receive and retain an illumination device in a predetermined position, the method comprising the steps of:
  (a) providing a pouch upper layer and a pouch lower layer;
  (b) sealing the pouch upper layer and the pouch lower layer to form a pouch, with gripping means provided as one or more projections, the gripping means and configured to retain the illumination device in a predetermined position.

14. A method according to claim 13 wherein step (a) further comprises providing a valve upper layer and a valve lower layer, and step (b) further comprises sealing the together the valve upper layer and the valve lower later to form a valve.

15. A method according to claim 14 wherein, in step (b) the valve upper layer and valve lower layer are sealed together along a second sealing path to define the valve.

16. A method according to claim 14 wherein, in step (a), the pouch upper layer is connected to the pouch lower layer by a pouch fold line; the pouch lower layer is connected to the valve upper layer by an intermediate cut line; and the valve upper layer is connected to the valve lower layer by a valve fold line.

17. A method according to claim 16 wherein the method comprises, after step (a) and before step (b):
  cutting the intermediate cut line to separate the pouch lower layer from the valve upper layer;
  folding along the valve fold line so that the valve upper layer is arranged on the valve lower layer;
  folding along the pouch fold line so that the pouch upper layer is arranged on the pouch lower layer.

18. A method according to claim 13 wherein, in step (a), at least one of the pouch upper layer, the pouch lower layer, where present the valve upper layer and where present the valve lower layer is provided with one or more heat-resistant patches.

19. A method according to claim 13 wherein, in step (a), the pouch upper layer, the pouch lower layer, where present the valve upper layer and where present the valve lower layer are provided on a single film.

20. A method according to claim 13 wherein, in step (b), the pouch upper layer and the pouch power layer are sealed together along a first sealing path to define the pouch.

21. A method according to claim 13 wherein the method comprises, after step (b), inserting an illumination device into the pouch; and mounting the pouch assembly in an inflatable toy.

22. A method according to claim 13 wherein the method comprises, after step (b), arranging the pouch assembly in inflatable toy material; optionally cutting the inflatable toy material; and sealing the assembly in the inflatable toy material.

23. A method according to claim 13 wherein the method comprises manufacturing an array of pouch assemblies, wherein step (a) comprises providing respective pouch upper layers, pouch lower layers, where present valve upper layers and where present valve lower layers; and step (b) comprises sealing together the pouch upper layers and the pouch lower layers to form respective pouches, and where present the valve upper layers and the valve lower layers to form respective valves.

* * * * *